(12) United States Patent
Chapman et al.

(10) Patent No.: US 8,268,395 B2
(45) Date of Patent: Sep. 18, 2012

(54) METHOD FOR PROVIDING RESISTANCE TO BIOFOULING IN A POROUS SUPPORT

(75) Inventors: John S. Chapman, New London Township, PA (US); Jiang Ding, Wilmington, DE (US); Yu-Ling Hsiao, Villanova, PA (US); Christian Peter Lenges, Wilmington, DE (US); Yanhui Niu, Newark (DE); Stefan Reinartz, Wilmington (DE); Cheryl Marie Stancik, Wilmington (DE); Judith Johanna Van Gorp, Wilmington (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 933 days.

(21) Appl. No.: 11/400,428

(22) Filed: Apr. 6, 2006

(65) Prior Publication Data
US 2007/0125703 A1 Jun. 7, 2007

Related U.S. Application Data

(63) Continuation-in-part of application No. 11/294,009, filed on Dec. 5, 2005.

(51) Int. Cl.
*B05D 5/00* (2006.01)
*B29C 44/04* (2006.01)
*B01D 29/00* (2006.01)
*B01D 29/46* (2006.01)
*B01D 24/00* (2006.01)
*B01D 39/00* (2006.01)

(52) U.S. Cl. .......... 427/245; 55/527; 210/490; 210/504; 210/505; 264/45.1; 428/221

(58) Field of Classification Search .......... 210/504, 210/490, 505; 264/45.1; 427/245; 428/221; 55/527
See application file for complete search history.

(56) References Cited

U.S. PATENT DOCUMENTS
4,610,863 A 9/1986 Tewari et al.
4,629,652 A 12/1986 Carlson et al.
(Continued)

FOREIGN PATENT DOCUMENTS
EP 1707561 A1 * 10/2006
(Continued)

OTHER PUBLICATIONS

Shi et al., The Gelation of CO2: A Sustainable Route to the Creation of Microcellular Materials, Science, vol. 286, 1999, pp. 1540-1542.*
(Continued)

*Primary Examiner* — Krishnan S Menon
*Assistant Examiner* — Dirk Bass

(57) ABSTRACT

The invention is a process useful for providing a treated support comprising a porous nanoweb coating wherein the treated support is characterized by a biofilm cell count of less than 50% that of an untreated porous support control. The process is useful for modifying porous materials, such as filter media and barrier fabrics to provide resistance to biofouling. The porous nanoweb coating is comprised of fibrous structures derived from gelation and drying of supramolecular assemblies of non-covalently bonded organogelators. Typical organogelators useful in the invention include those that assemble via hydrogen bonding and π-stacking.

16 Claims, 1 Drawing Sheet

U.S. PATENT DOCUMENTS

| | | | |
|---|---|---|---|
| 4,894,157 A | | 1/1990 | Johnson |
| 5,156,895 A | | 10/1992 | Martin |
| 5,340,613 A | | 8/1994 | Hanzalik et al. |
| 5,415,993 A | * | 5/1995 | Hanzalik et al. ............... 430/619 |
| 5,627,217 A | | 5/1997 | Rilling et al. |
| 5,772,735 A | | 6/1998 | Sehgal et al. |
| 5,892,116 A | | 4/1999 | Weiss et al. |
| 6,320,018 B1 | | 11/2001 | Sijbesma et al. |
| 6,872,243 B2 | | 3/2005 | Breton |
| 2004/0038014 A1 | | 2/2004 | Schaefer et al. |
| 2004/0092185 A1 | | 5/2004 | Grafe et al. |
| 2004/0203149 A1 | | 10/2004 | Childs et al. |
| 2004/0213918 A1 | | 10/2004 | Mikhael et al. |
| 2004/0223987 A1 | | 11/2004 | Ferrari |
| 2009/0047435 A1 | * | 2/2009 | Hutchenson et al. ......... 427/384 |
| 2009/0047498 A1 | * | 2/2009 | Hutchenson et al. ...... 428/304.4 |

FOREIGN PATENT DOCUMENTS

| | | |
|---|---|---|
| WO | WO 98/17377 | 4/1998 |
| WO | WO 00/35998 | 6/2000 |
| WO | WO 2004/027140 A1 | 4/2004 |
| WO | WO 2005/037415 A1 | 4/2005 |

OTHER PUBLICATIONS

STIC EIC search on Claims 1-16.*

Shi et al., "The Gelation of CO2: A Sustainable Route to the Creation of Microcellular Materials", Science (1999) 286, 1540-1543.

Lange et al., "Hydrogen-Bonded Supramolecular Polymer Networks", J. Polym. Sci., A: Polym. Chem. (1999) 37, 3657-3670.

Carr et al., "The Design of Organic Gelators: Solution and Solid State Properties of a Family of Bis-Ureas", Tetrahedron Lett. (1998) 39, 7447-7450.

Weiss et al., "Organogels and Low Molecular Mass Organic Gelators", Adv. Mater. (2000) 12, No. 17, 1237-1247.

Huang et al., "Generation of Microcellular Materials via Self-Assembly in Carbon Dioxide", Chem. Mater. (2002) 14, 4273-4280.

Blainey et al., "The Use of Block Copolymers to Inhibit Bacterial Adhesion and Biofilm Formation on Hydrophobic Surfaces in Marine Habitats", Biofouling (1991) 4, 309-318.

Jansen et al., "Prevention of Biofilm Formation by Polymer Modification", Journal of Industrial Microbiology (1995), 115, 391-396.

* cited by examiner

METHOD FOR PROVIDING RESISTANCE TO BIOFOULING IN A POROUS SUPPORT

FIELD OF INVENTION

The invention is related to material science and is a process for providing a treated porous support comprising a porous nanoweb coating, useful as filter media and barrier fabrics, wherein the treated support has resistance to biofouling.

BACKGROUND OF INVENTION

The substantial removal of some or all of a particulate material from a fluid stream, e.g. gas or aqueous stream, can be important for many reasons including safety and health, machine operation, and aesthetics. Filter media materials are used in filtration structures placed in the fluid path to obtain physical separation of the particulate from the fluid flow. Filter media are desirably mechanically stable, have good fluid permeability, relatively small pore size, low pressure drop and resistance to the effects of the fluid such that they can effectively remove the particulate from the fluid over a period of time without serious mechanical media failure. Filter media can be made from a number of materials in woven, non-woven or film material forms. Such materials can be air laid, wet laid, melt blown, or otherwise formed into a sheet-like material with an effective pore size, porosity, solidity, or other filtration requirements.

Material and non-woven filter elements can be used as surface loading media. In general, such elements comprise porous films or dense mats of cellulose, cellulose derivatives, glass, PTFE, synthetic polymers, and fibers oriented across a stream carrying particulate material. The media is generally constructed to be permeable to the fluid flow, and to also have a sufficiently fine pore size and appropriate porosity to inhibit the passage of particles greater than a selected size therethrough. As materials pass through the media, the upstream side of the media operates through diffusion and interception to capture and retain selected sized particles from the fluid (gas or liquid) stream. The particles are collected as a dust cake on the upstream side of the filter media, in the case of a gas stream, for instance. In time, the dust cake also begins to operate as a filter, increasing efficiency. This is sometimes referred to as "seasoning," i.e. development of an efficiency greater than initial efficiency. PTFE materials and similar microporous materials, primarily operate as surface loading or barrier filters.

Dense woven and nonwoven fabrics can operate as a combination of surface loading media and depth media, wherein the particles are trapped throughout the depth of the media. The pore size of the fabrics is dependent upon the size and density of the fibers and the process by which they are formed. The efficiency of the filter media is dependent upon many parameters including the depth of the filter media, pore size, and electrostatic nature of the material. However, it is often desirable to fine-tune the pore properties of depth media as exemplified in the following patents and patent applications.

Carlson, et al., in U.S. Pat. No. 4,629,652, discloses a process for providing a palletized aerogel comprising a support structure to a silicon-based pre-gel heated to supercritical conditions. Upon venting the fluid phase under supercritical conditions, the aerogel forms on and/or within the support structure. This method of solvent removal avoids the inherent shrinkage of the solid product that occurs when conventional drying techniques are employed. Martin, in U.S. Pat. No. 5,156,895, discloses a body including a support structure in which is formed monolithic aerogel. One aspect of the method of making the body includes a solvent substitution step and a supercritical drying step. In both of these cases, the aerogel is a covalently bonded cross-linked network.

Woven and nonwoven fabrics are also used extensively in the protective apparel and building products markets. A key characteristic of barrier products is the ability to allow passage of air, while inhibiting the passage of particles, water, and other liquids. WO 2004/027140 entitled "Extremely High Liquid Barrier Fabrics," for instance, discloses many aspects of barrier fabrics.

In US 2004/0213918, Mikhael, et al., discloses a coating process that allows modification of the surface properties of a porous substrate without changing significantly the air permeability. This process is described as being accomplished by controlling the coating of individual fibers in ultra-thin layers that do not extend across the pores in the material.

In humid environments, for instance, air conditioning units, and water filtration systems, biofouling of porous substrates can be a significant issue in determining the service life of filtration media and barrier fabrics. The initial interactions between a bacterial cell and a solid surface are determined by physico-chemical events, primarily ionic and hydrophobic interactions. The initial events result in a reversible adherence of the cell to the surface; as time progresses this adherence becomes irreversible due to the synthesis of exopolymeric materials which eventually encase the cell in a matrix comprising the bulk of the biofilm. In general, bacterial cell surfaces tend to be anionic and hydrophilic, thus negatively charged and/or hydrophobic surfaces tend to be more difficult to colonize. Disruption of the initial events by alteration of the surface charge or moderate increases in hydrophobicity has been shown to lead to a reduction in the ability of the bacteria to colonize the surface.

At the same time, methods for preventing biofouling are desired that do not include the use of highly toxic compounds. Needed are processes to provide porous materials with resistance to biofouling while maintaining filtration and/or barrier properties and without using toxic materials.

SUMMARY OF INVENTION

One embodiment of the invention is a method for providing resistance to biofouling in a porous support, comprising: (a) providing a porous support; (b) providing a gelling mixture comprising a solvent and one or more organogelator(s); (c) applying the gelling mixture to the porous support to provide a coated support; (d) gelling the coated support to form a nanoweb gel; and (e) removing the solvent(s) from the nanoweb gel to provide a treated support comprising a porous nanoweb coating; wherein the treated support is characterized by a biofilm cell count of less than 50% that of an untreated porous support control.

DETAILED DESCRIPTION

Figure 1A:
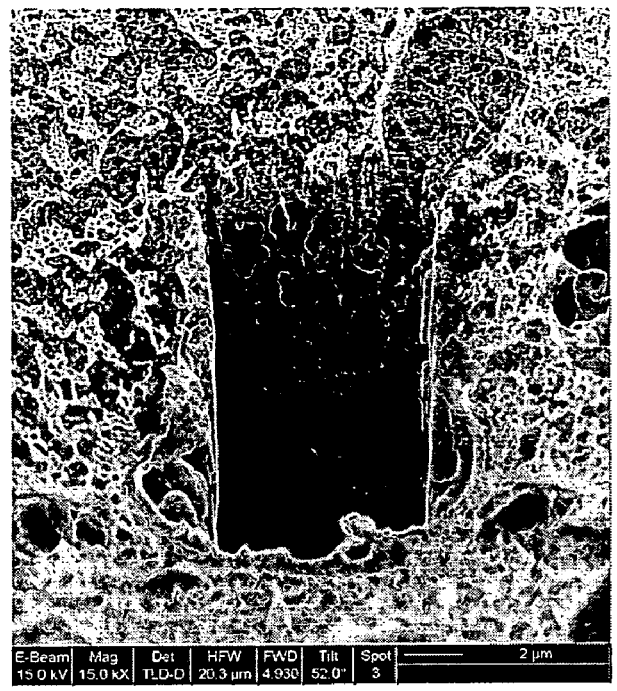
FIG. 1 illustrates the DB-SEM micrograph at (A) 15000× and (B) 35000× magnification showing a nanoweb coating on a porous support.

Conventional porous supports used as filter media and other barrier fabrics can be modified by applying a gelling mixture containing an organogelator to the porous support, followed by gelling the organogelator to form a nanoweb gel, and removal of the solvent to provide a porous nanoweb coating. The porous nanoweb coating may also may interpenetrate the porous support. The resulting treated support has been found to exhibit antimicrobial properties characterized by a biofilm cell count of less than 50% that of an untreated porous support control.

Supports

Porous supports useful in the invention include those characterized by an average mean flow pore diameter of about 10 nm and greater, and more preferably 100 nm to 100 micron, as determined by the well known technique of capillary flow porometry described by Mayer in "Porometry measurement of air filtration media," [American Filtration Separations Society 2002, Topical Conference (2002, November 14-15) Cincinnati, Ohio]. Similar methods for characterization of liquid microporous membranes are defined in U.S. Pat. No. 6,413,070, and references cited therein, herein incorporated by reference.

Porous supports useful in the invention include woven and nonwoven fabrics, sheet materials, and films, monolithic aggregates, powders, and porous articles such as frits and cartridges. Porous supports include: woven fabrics comprising glass, polyamides including but not limited to polyamide-6,6 (PA-66), polyamide-6 (PA-6), and polyamide-6, 10 (PA-610), polyesters including but not limited to polyethylene terephthalate (PET), polytrimethylene terephthalate, and polybutylene terephthalate (PBT), rayon, cotton, wool, silk, and combinations thereof; nonwoven materials having fibers of glass, paper, cellulose acetate, and nitrate, polyamides, polyesters, polyolefins including bonded polyethylene (PE) and polypropylene (PP), and combinations thereof. Porous supports include nonwovens fabrics, for instance, polyolefins including PE and PP such as TYVEK® (flash spun PE fiber), SONTARA® (nonwoven polyester), and XAVAN® (nonwoven PP), SUPREL®, a nonwoven spunbond-meltblown-spunbond (SMS) composite sheet comprising multiple layers of sheath-core bicomponent melt spun fibers and side-by-side bicomponent meltblown fibers, such as described in U.S. Pat. No. 6,548,431, U.S. Pat. No. 6,797,655, and U.S. Pat. No. 6,831,025, herein incorporated by reference, all trademarked products of E. I. du Pont de Nemours and Company; nonwoven composite sheet comprising sheath-core bicomponent melt spun fibers, such as described in U.S. Pat. No. 5,885,909, herein incorporated by reference; other multi-layer SMS nonwovens that are known in the art, such as PP spunbond-PP meltblown-PP spunbond laminates; nonwoven glass fiber media that are well known in the art and as described in Waggoner, U.S. Pat. No. 3,338,825, Bodendorf, U.S. Pat. No. 3,253,978, and references cited therein, hereby incorporated by reference; and KOLON® (spunbond polyester) a trademarked product of Korea Vilene. The nonwovens materials include those formed by web forming processing including dry laid (carded or air laid), wet laid, spunbonded and melt blown. The nonwoven web can be bonded with a resin, thermally bonded, solvent bonded, needle punched, spun-laced, or stitch-bonded. The bicomponent melt spun fibers, referred to above, can have a sheath of PE and a core of polyester. If a composite sheet comprising multiple layers is used, the bicomponent melt-blown fibers can have a PE component and a polyester component and be arranged side-by-side along the length thereof. Typically, the side-by-side and the sheath/core bicomponent fibers are separate layers in the multiple layer arrangement.

Preferred nonwoven porous supports include woven fabrics comprising glass, polyamides, polyesters, and combinations thereof; and nonwoven fabrics comprising glass, paper, cellulose acetate and nitrate, polyamides, polyesters, polyolefins, and combinations thereof. Most preferred porous supports include nonwoven bonded PE, PP, and polyester, and combinations thereof.

Other preferred nonwoven porous supports include electrospun nanofiber supports such as described by Schaefer, et al., in US 2004/0038014, hereby incorporated by reference; and electro-blown nanofiber supports disclosed in Kim, WO 2003/080905, hereby incorporated by reference. The nanofiber supports can be self-supporting or can be supported by other porous support layers. Preferably, the electropsun fiber supports are nanofiber supports comprised of nanofibers with an effective fiber diameter in the range of about 20 nm to about 1 µm, and preferably about 100 nm to about 750 nm. Nanofiber supports useful in the invention include those derived from electro-spinning of polyester, polyamide, cellulose acetate, polyvinylidene fluoride (PVdF), polyacrylonitrile (PAN), polysulfone, polystyrene (PS), and polyvinyl alcohol (PVA). A preferred nanofiber porous support is incorporated into a layered structure comprising one or more other porous supports or scrims, for instance, nonwoven bonded PE or PP, and one or more layers of nanofiber, such as described in U.S. patent application Ser. No. 10/983,513 filed in November 2004, hereby incorporated by reference.

Other porous supports include microporous polymer films and sheet materials such as polyethersulfone, hydrophilic polyethersulfone, polyamide, PP, polytetrafluoroethylene (PTFE), and cellulose esters including cellulose acetate and nitrate. Microporous polymer films include stretched PTFE materials such as those manufactured by W. L. Gore and Associates, Inc. under the trade name GORE-TEX®, and the PTFE material trade named TETRATEX®, manufactured by the Donaldson Company; PP membranes; hydrophilic PP membranes, nitrocellulose membranes such as BIOTRACE™ NT, modified nylon membranes such as BIO-INERT®, PVdF membranes such as BIOTRACE™ PVDF, polyethersulfone membranes such as OMEGA™, SUPOR® hydrophilic polyethersulfone membrane, ion exchange membranes such as MUSTANG™, all brand names of Pall Life Sciences; nylon membranes disclosed in U.S. Pat. No. 6,413,070 and references cited therein, herein incorporated by reference. Preferred microporous polymer films are polyethersulfone, hydrophilic polyethersulfone, polyamide, PP, PTFE, and cellulose esters.

Further porous supports include inorganic materials comprising clay, graphite, talc, glass, sintered metals and ceramics; and wood and wood laminates. The above list of porous supports while extensive is not meant to be exhaustive; other supports may be likewise used in the process detailed in the examples as one skilled in the art may readily accomplish.

In some instances, it may be advantageous to coat nonporous supports with the process of the present invention. Nonporous supports useful in the invention include nonporous glass, ceramic, metal, thermoplastic and thermoset polymers, and composites thereof.

Porous Nanoweb By "porous nanoweb" we mean a non-covalently-bonded supramolecular assembly of molecules that has the morphology of a web. The nanoweb is comprised of self-assembled fibrous structures, including fibers, strands, and/or tapes, of sufficient geometry and length to interact with one another through junctions to form network structures. Preferably the fibrous structures are between about 10 nm and about 1000 nm effective average fiber diameter as determined with electron microscopy, either transmission electron microscopy (TEM) or SEM. The term "effective fiber diameter" is defined as the mean diameter of about 15-20 fibers in a given SEM or TEM image. The nanoweb fibrous structures may be crystalline, liquid crystalline, amorphous or a mixture of phases; and are comprised of one or more organogelator(s). Preferably, the nanoweb is comprised of one or more H-bonded organogelator(s) or π-stacked organogelator(s), defined further below. In one embodiment the nanoweb is substantially crystalline and may exhibit a melting point. Preferred nanowebs comprise organogelators with melting points of between about 100° C. and about 300° C., and more preferably, between about 100° C. and about 220° C.

The nanoweb fibrous structures coat the surface of the porous support and can also be present within the porous support. Throughout the specification discussion of characterizations of the "treated support" or "nanoweb" means the characterizations of the composite material comprising the nanoweb and porous support, unless specifically stated otherwise.

Organogelators

The gelling mixture comprises one or more organogelator(s). An organogelator is defined herein to include a non-polymeric organic compound whose molecules can establish, between themselves, at least one physical interaction leading to a self-assembly of the molecules in a carrier fluid, with formation of a 3-D network, or a "nanoweb gel", that is responsible for gelation of the carrier fluid. The nanoweb gel may result from the formation of a network of fibrous structures due to the stacking or aggregation of organogelator molecules. Depending on the nature of the organogelator, the fibrous structures have variable dimensions that may range up to one micron, or even several microns. These fibrous structures include fibers, strands and/or tapes.

The term "gelling" or "gelation" means a thickening of the medium that may result in a gelatinous consistency and even in a solid, rigid consistency that does not flow under its own weight. The ability to form this network of fibrous structures, and thus the gelation, depends on the nature (or chemical structure) of the organogelator, the nature of the substituents, the nature of the carrier fluid, and the particular temperature, pressure, concentration, pH, shear conditions and other parameters that may be used to induce gelation of the medium. The nanoweb gels used in the invention can be reversible. For instance, gels formed in a cooling cycle may be dissipated in a heating cycle. This cycle of gel formation can be repeated a number of times since the gel is formed by physical, non-covalent interactions between gelator molecules, such as hydrogen bonding.

The process of the invention can be practiced using a nanoweb gel that comprises a nanoweb phase and a fluid phase, which, upon removal of the fluid, forms a porous nanoweb. The applicants have found that this capability is strongly dependent upon the particular structural characteristics of the organogelator and particular processing parameters including the nature of the solvent, temperature, gelator concentration, method of solvent removal, and the nature of the porous support.

The physical interactions of the organogelators are diverse and may include interactions chosen from hydrogen-bonding interactions, π-interactions between unsaturated rings, dipolar and van der Waals interactions, and coordination bonding with organometallic derivatives. In general, the non-covalent forces are weak compared to covalent bonds, which makes them reversible, and it requires that several of them be combined to form a strong association. For example, as discussed in Goshe, et al. (Proc. Nat. Acad. Sci. USA (2002) 99, 4823), the energy of a covalent C-C bond is 350 kJ/mol, while the energy of a hydrogen bond ranges from 4 to 120 kJ/mol, and that of a π-stack from 4 to 20 kJ/mol. The establishment of these interactions may often be promoted by the architecture of the molecule, such as by one or more heteroatom-hydrogen bonds, aromatic rings, unsaturation, bidentate metal coordination sites, and favorable packing geometries. In general, each molecule of an organogelator can establish several types of physical interaction with a neighboring molecule. Thus, in one embodiment, the organogelator according to the invention preferably comprises at least one conjugated group capable of establishing at least two hydrogen bonds; at least one group having at least two aromatic rings in conjugation; at least one group having 14-atom aromatic system; or at least one group capable of bidentate coordination with a metal ion. The organogelators useful in the invention include those selected from the group: H-bonded organogelators, π-stacked organogelators, van der Waals-complexed, and metal coordinated organogelators; and preferably, are further characterized by a molecular weight of about 200 to about 5000 g/mol; and more preferably, by a molecular weight of about 200 to about 2000 g/mol.

H-bonded Organogelators

The H-bonded organogelators useful in the invention include those characterized by at least two N—H bonds per molecule wherein the nitrogens are bound to at least one carbonyl group, and preferably, they have at least four N—H bonds per molecule. Preferred are organogelators having two or more groups per molecule selected from the group of: urea, ureido-pyrimidone, ureido-triazine, amide, urethane, and a mixture thereof. Thus, bis urea compounds, bis urethane compounds, bis amide compounds, bis ureido-pyrimidones, urea amides, urea urethanes, urea ureido-pyrimidones, and the like are useful in the invention. Organogelators comprised of one or more urea groups are especially preferred.

H-bonded organogelators useful in the invention, methods of preparation, and methods for gelling specific organogelators are well know in the art. In addition to the references cited above in the background, Ferrari in US 2004/0223987, hereby incorporated by reference, discloses on pages 11 thru 15, diamides, diurethanes, diureas, and urethane-ureas useful as gelators. Breton, et al., in U.S. Pat. No. 6,872,243, hereby incorporated by reference, discloses classes of bis-ureas, ureidopyrimidones and bis-ureidopyrimidones useful as organogelators. Sijbesma, et al., in U.S. Pat. No. 6,320,018, hereby incorporated by reference, discloses further bis-ureidopyrimidones and synthetic methods for preparation of the same.

Preferred H-bonded organogelators include those of formulae (I), (IIA), (IIB), (IIC) and (IID) including isomers or mixtures of isomers thereof:

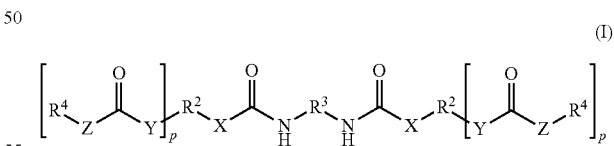

(I)

wherein
p is 0, 1, 2, or 3;
wherein
$R^3$ is a divalent C3 to C18 linear or branched alkylene group, optionally, interrupted by one or two —OC(O)— groups; C1 to C6 linear or branched alkylene group bearing a C5-C16 cycloaliphatic group; C5-C16 cycloaliphatic or alkyl substituted cycloaliphatic group; C6 to C16 aromatic or alkyl substituted aromatic group; or C1 to C6 alkyl bearing an C6 to C16 aromatic or alkyl substituted aromatic group, optionally substituted on the aromatic group with Cl, Br, I, F, CF$_3$, CF$_3$O; a —(CH$_2$CH$_2$O)$_m$(CH$_2$CH$_2$)— group with m being 1 to 4; and R$^4$ independently is a monovalent C2 to C16 linear or branched alkyl group; C5 to C12 cycloaliphatic group; C6 to C16 cycloaliphatic group bearing a linear or branched C1 to C8 alkyl group; C6 to C16 aromatic or alkyl substituted aromatic group; C1 to C6 alkyl bearing an C6 to C16 aromatic or alkyl substituted aromatic group; —(CH$_2$CH$_2$O)$_n$CH$_3$ group with n being independently 1 to 8; all aromatic groups optionally substituted with Cl, Br, I, F, CF$_3$, CF$_3$O and all alkyl and cycloaliphatic groups optionally substituted with one or two carbon-carbon double bonds;

wherein if p is 0, R$^2$ is a monovalent C1 to C16 linear or branched alkyl group, a C1 to C6 linear or branched alkyl group bearing a C5-C16 cycloaliphatic group, a C5-C16 cycloaliphatic or alkyl substituted cycloaliphatic group, a C6 to C16 aromatic or alkyl substituted aromatic group, a C1 to C6 alkyl bearing an C6 to C16 aromatic or alkyl substituted aromatic group, all optionally substituted on the aromatic group with one or two Cl, Br, I, F, CF$_3$, and CF$_3$O; all alkyl and cycloaliphatic groups optionally substituted with one or two carbon-carbon double bonds; all aliphatic and cycloaliphatic groups optionally substituted with —H, —OR$^6$, —Si(OR$^6$)$_3$, or —C(O)OR$^6$; wherein R$^6$ is C1 to C16 linear or branched alkyl group; or C6 to C16 aromatic group; and X is NH, O, or nothing;

wherein if p is 1, R$^2$ is a divalent C1 to C8 linear or branched alkyl, a C1 to C6 alkyl bearing an C6 to C10 aromatic or alkyl substituted aromatic group, a —(CH$_2$CH$_2$O)$_n$(CH$_2$CH$_2$)— group with n being 1 to 4, wherein if p is 2, R$^2$ is Formula (IIIa) and if p is 3, R$^2$ is Formula (IIIb)

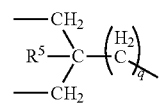

(IIIa)

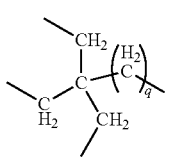

(IIIb)

wherein q is 0 or 1; and R$^5$ is H, a C1 to C5 linear alkyl group;

wherein if p is 1, 2, or 3, X is chosen from O or NH, Y is chosen from O, NH, or nothing, with the proviso that if X is O, Y cannot be O, and if X is NH, Y cannot be NH, Z is chosen from O, NH, or nothing; formula (IIA)

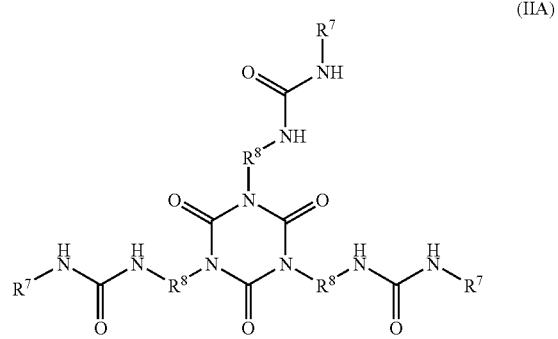

(IIA)

wherein

R$^7$ is a monovalent C1 to C16 linear or branched alkyl group; C1 to C6 linear or branched alkyl group bearing a C5-C16 cycloaliphatic group; C5-C16 cycloaliphatic or alkyl substituted cycloaliphatic group; C6 to C16 aromatic or alkyl substituted aromatic group; C1 to C6 alkyl bearing an C6 to C16 aromatic or alkyl substituted aromatic group; optionally substituted on the aromatic group with one or two Cl, Br, I, F, CF$_3$, and CF$_3$O; all aliphatic and cycloaliphatic groups optionally substituted with one or two carbon-carbon double bonds, all aliphatic and cycloaliphatic groups optionally interrupted by one or two —OC(O)— groups, all aliphatic and cycloaliphatic groups optionally substituted with —OH, —OR$^6$, —Si(OR$^6$)$_3$;

wherein

R$^6$ is C1 to C16 linear or branched alkyl group; or C6 to C16 aromatic group; and R$^8$ is a divalent C3 to C8 linear or branched alkylene group; C1 to C6 linear or branched alkylene group bearing one or two C5-C8 cycloaliphatic groups; C5-C16 cycloaliphatic or alkyl substituted cycloaliphatic group; C6 to C16 aromatic or alkyl substituted aromatic group; C1 to C6 alkyl bearing an C6 to C16 aromatic or alkyl substituted aromatic group; formula (IIB)

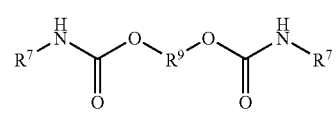

(IIB)

wherein

R$^9$ is a divalent C2 to C18 linear or branched alkylene group; C1 to C6 linear or branched alkylene group bearing a C5-C16 cycloaliphatic group; C5-C16 cycloaliphatic or alkyl substituted cycloaliphatic group; —(CH$_2$CH$_2$O)$_m$(CH$_2$CH$_2$)— group with m being 1 to 4, and R$^7$ is as defined above; formula (IIC)

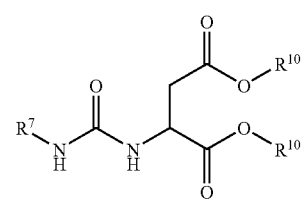

(IIC)

wherein
R[7] is as defined above and R[10] is —(CH$_2$)$_u$—(CF$_2$)$_v$—CF$_3$, with u equal to 1 to 4, and v equal to 0 to 9; and formula (IID)

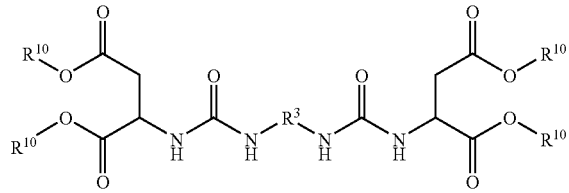

(IID)

wherein
R[3] is as defined above and R[10] is as defined above.

Materials of formulae (IV) to (XVI) are H-bonded organogelators useful in the invention. These structures are defined by formula (I) with p equal to 1, X equal to NH, Y equal to O and Z equal to NH, with R[2]-R[4] as defined above. The H-bonded organogelators (IV) to (XVI) are prepared by first reacting an amino alcohol component with a diisocyanate component. The reaction temperature, conditions and reactant concentration are selected to favor the formation of the intermediate addition product, a bis-urea diol derivative. Further reaction with a mono-isocyanate component forms the following H-bonded organogelators.

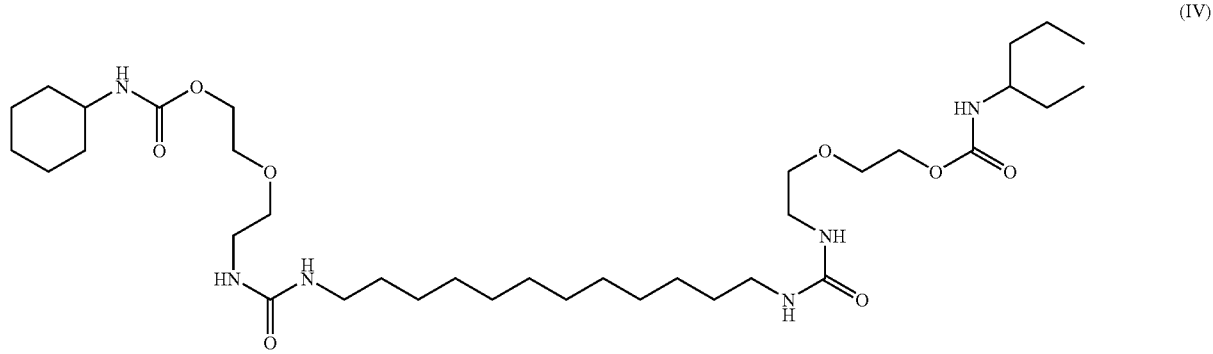

(IV)

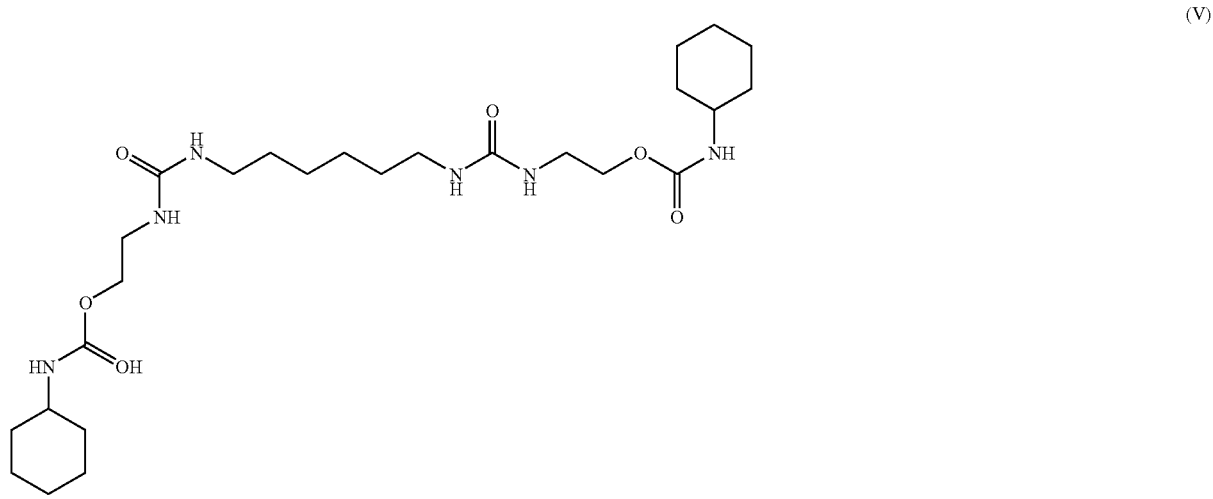

(V)

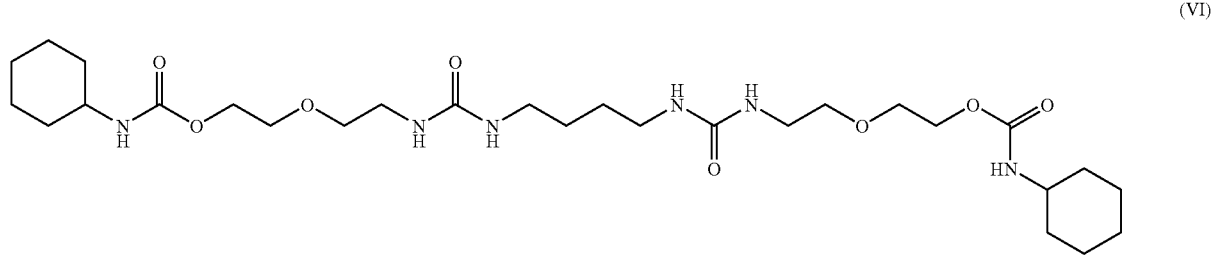

(VI)

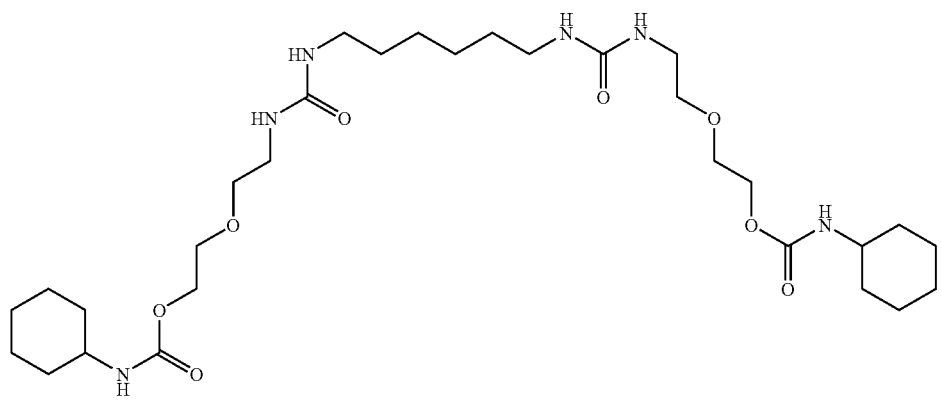
(VII)
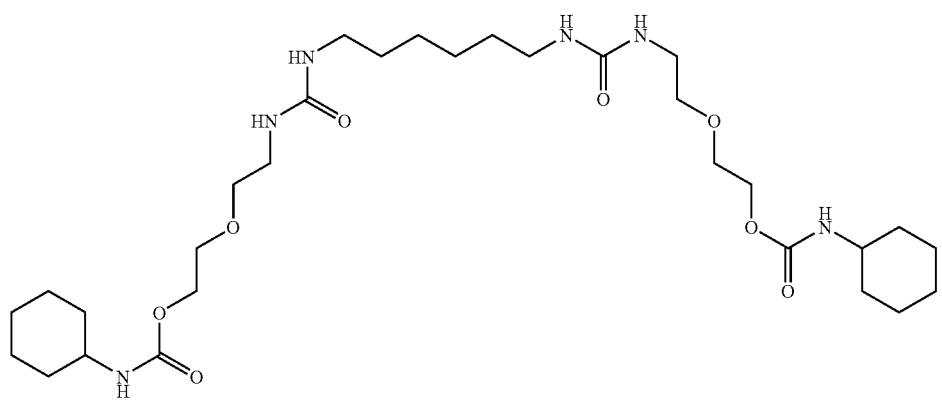
(VIII)
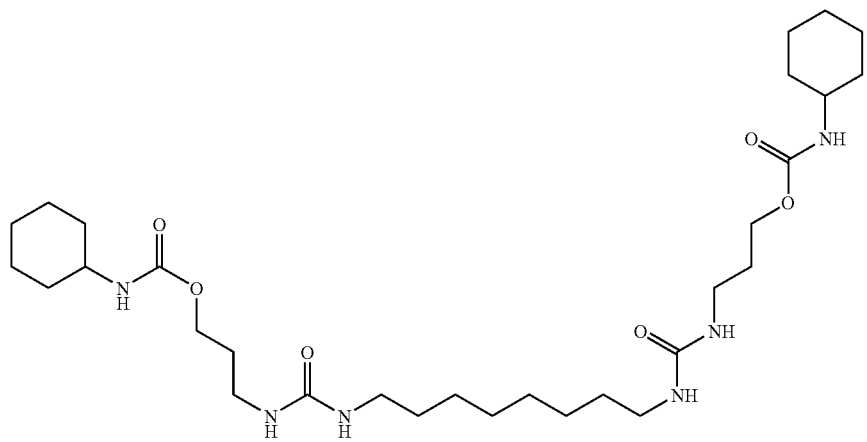
(IX)
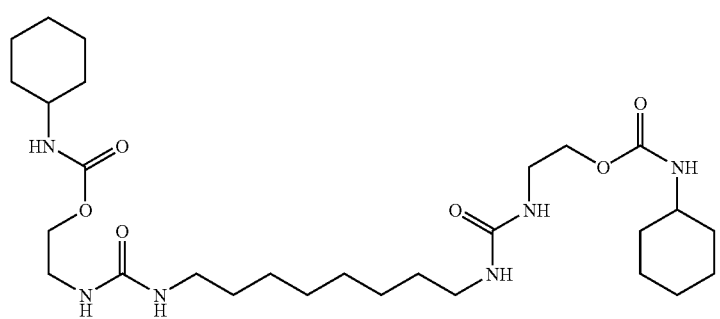
(X)

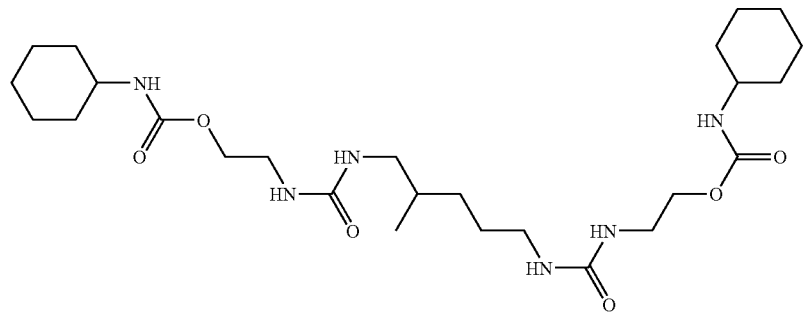
(XI)
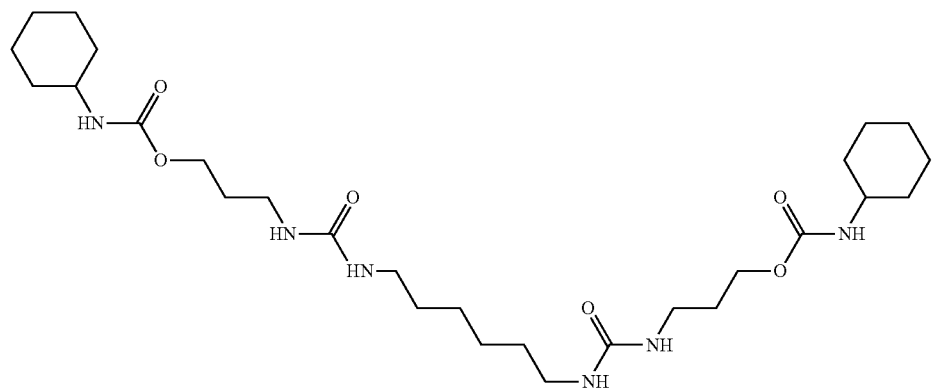
(XII)
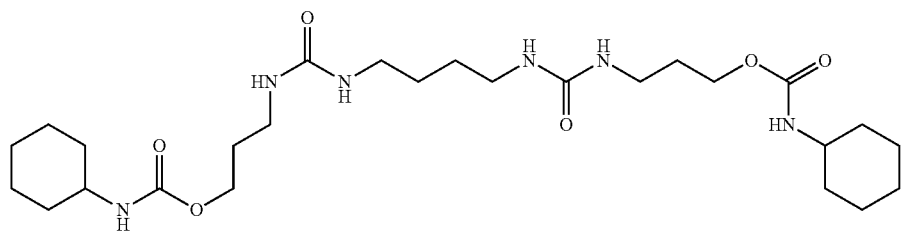
(XIII)
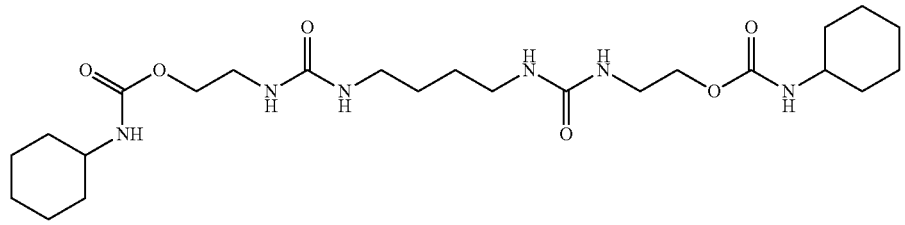
(XIV)
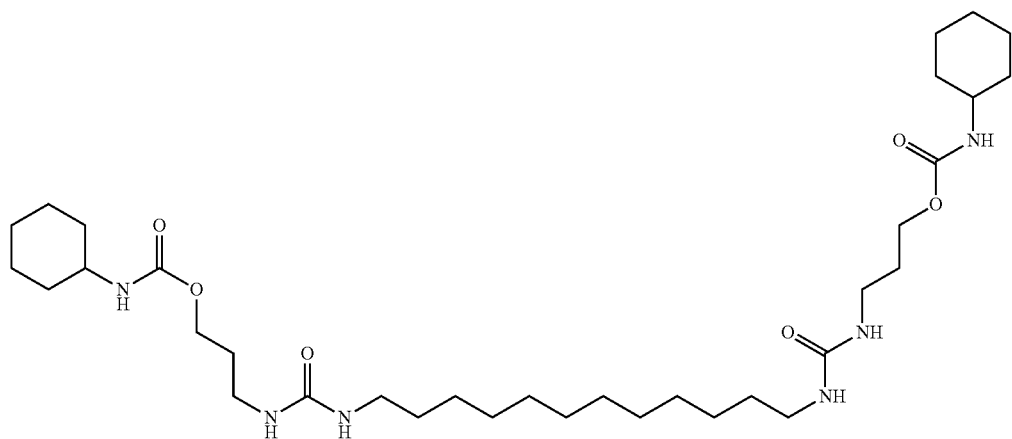
(XV)

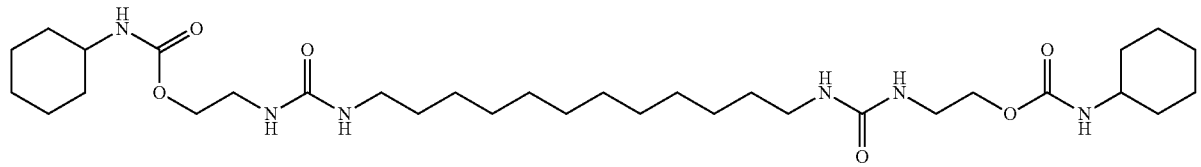

(XVI)

Other H-bonded organogelators useful in the invention include Com-pounds exemplified by the structure of formula (XVII). These structures are defined by formula (I) with p equal to 1, X equal to O, Y equal to NH and Z equal to NH, with $R^2$-$R^4$ as defined above. These H-bonded organogelators are prepared by first reacting an amino alcohol component with a monoisocyanate component. The obtained urea-alcohol is further reacted with a diisocyanate component.

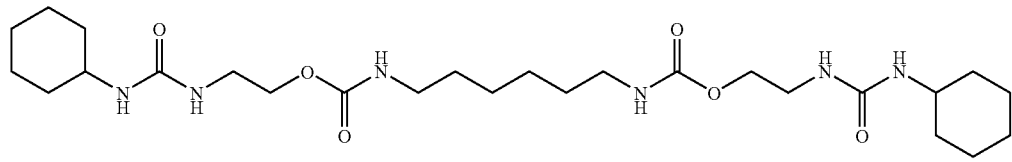

(XVII)

Other H-bonded organogelators useful in the invention include compounds having the structures of formulae (XVIII) to (XXII). These structures are defined by formula (I) with p equal to 1, X equal to NH, Y equal to O and Z equal to nothing, with $R^2$-$R^4$ as defined above. These H-bonded organogelators are prepared by first reacting an amino alcohol component with a diisocyanate component. The reaction temperature and reactant concentration is selected to favor the selective formation of the intermediate addition product. Further reaction with an acylation equivalent (known to those skilled in the art, such as acyl chlorides, carboxylic anhydrides) forms the following H-bonded organogelators.

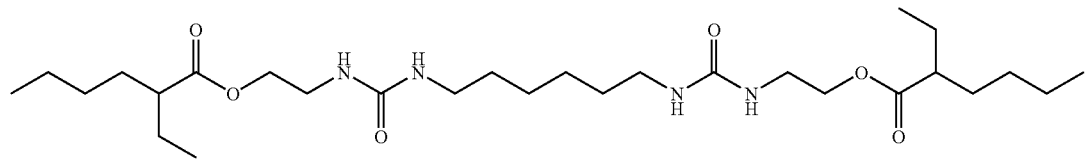

(XVIII)

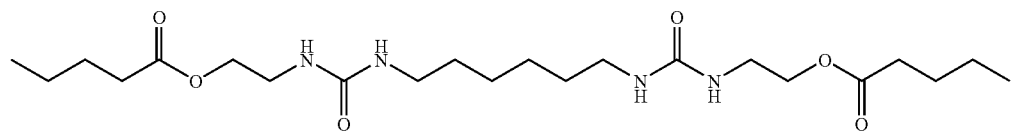

(XIX)

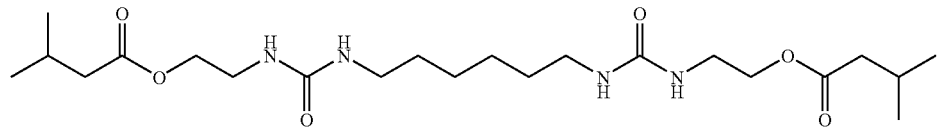

(XX)

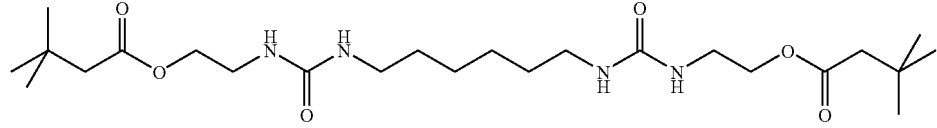

(XXI)

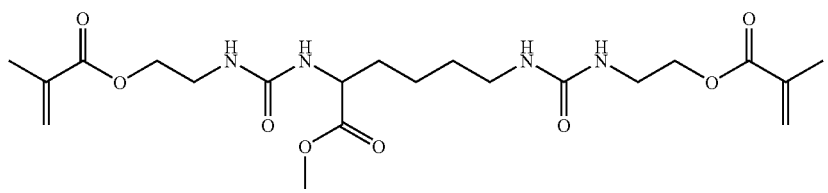

(XXII)

Other H-bonded organogelators useful in the invention include compounds having the structures of formulae (XXIII) and (XXIV). These structures are defined by formula (I) with p equal to 2, X equal to NH, Y equal to O and Z equal to NH, with $R^3$-$R^4$ as defined above, with $R^2$ equal to

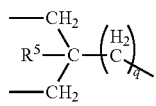

with $R^5$ equal to H and q equal to 0. These organogelators are prepared by first reacting an amino bis-alcohol component with a diisocyanate component. The reaction temperature, conditions and reactant concentration is selected to favor the formation of the intermediate addition product, a bis-urea tetraol derivative. Further reaction with a mono-isocyanate component forms the following organogelators.

Other H-bonded organogelators useful in the invention include compounds having the structure of formula (XXV). These structures are defined by formula (I) with p equal to 3, X equal to NH, Y equal to O and Z equal to nothing, with $R^3$-$R^4$ as defined above, with $R^2$ equal to

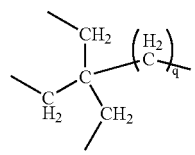

These organogelators are prepared by first reacting an amino tris-alcohol component with a diisocyanate component. The reaction temperature, conditions and reactant concentration is selected to favor the formation of the intermediate addition product, a bis-urea hexa-ol derivative. Further reaction with an acylation equivalent known to those skilled in the art, such as acyl chlorides and carboxylic anhydrides, forms the following organogelator.

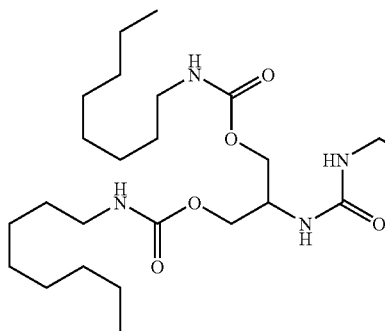
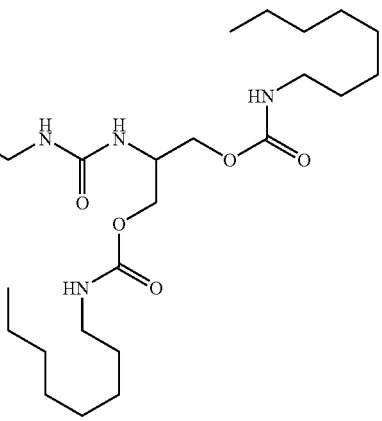

(XXIII)

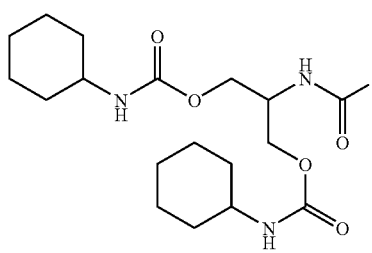
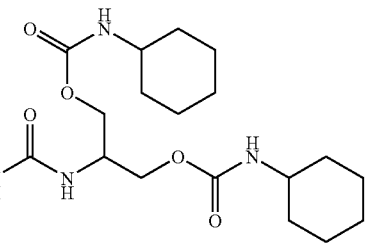

(XXIV)

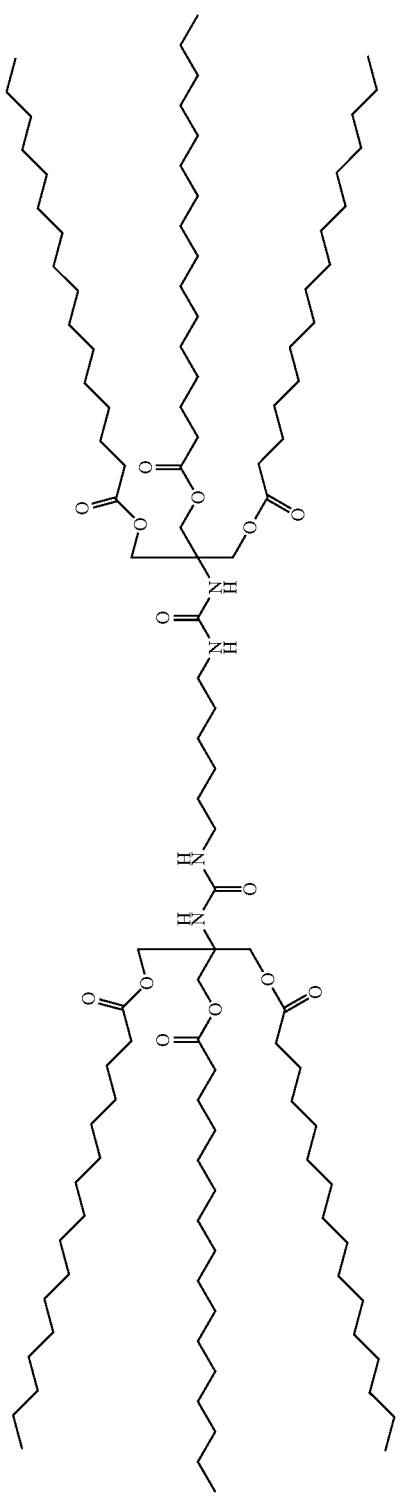

Other H-bonded organogelators useful in the invention include compounds having the structures of formulae (XXVI) to (XXIX). These structures are defined by formula (I) with p equal to 0, X equal to NH, with $R^2$ is as defined above and $R^3$ is a branched alkylene group or a cycloaliphatic ring. These organogelators agents are prepared by reacting a diisocyanate, in the indicated examples 2-methyl-1,5-pentamethylene diisocyanate or trans-1,2-cycloheane diisocyanate, with two equivalents of monoamine. For instance, Moreau, et al. (J. Am. Chem. Soc. (2001) 123, 1509) discloses the synthesis of structure (XXIX).

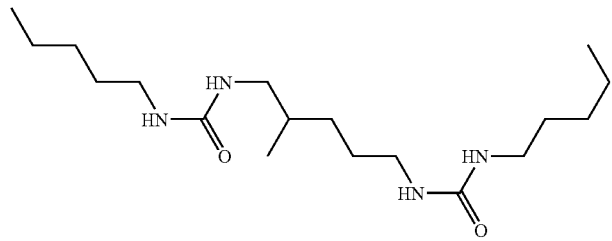

(XXVI)

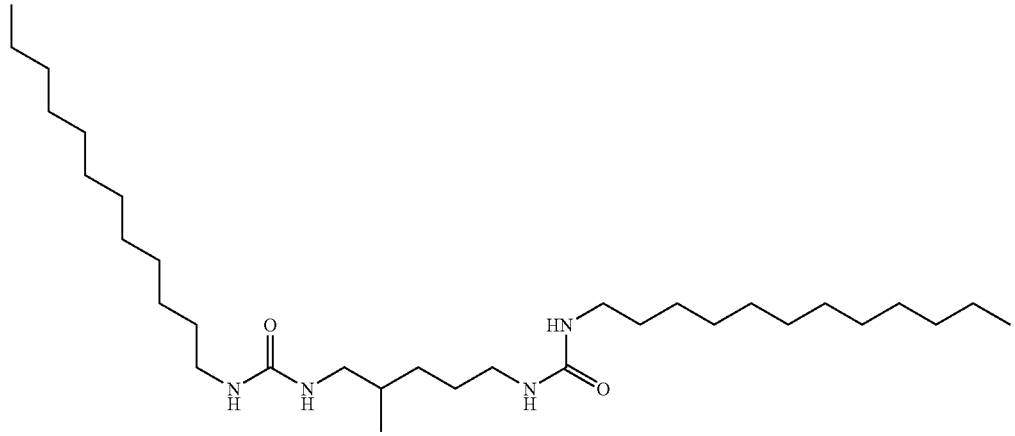

(XXVII)

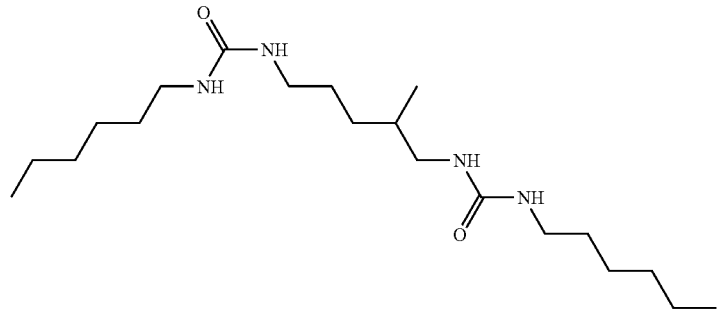

(XXVIII)

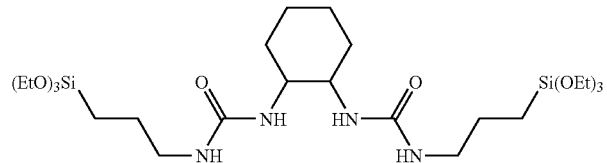

(XXIX)

Other H-bonded organogelators useful in the invention include compounds of formulae (XXX) to (XXXV). These structures are defined by formula (I) with p equal to 0, X equal to NH, with $R^2$ as defined above and $R^3$ being divalent group selected from C3 to C18 linear or branched alkylene groups interrupted by two —OC(O)— groups. These organogelators are prepared by first reacting an amino alcohol component with a monoisocyanate component. This intermediate urea alcohol is further reacted with a difunctional acylating component equivalent, such as bis-acyl chlorides or bis-carboxylic anhydrides, to form the organogelator. Alternatively, the parent bis-carboxylic acids may be utilized in a selective esterification reaction to form the desired products.

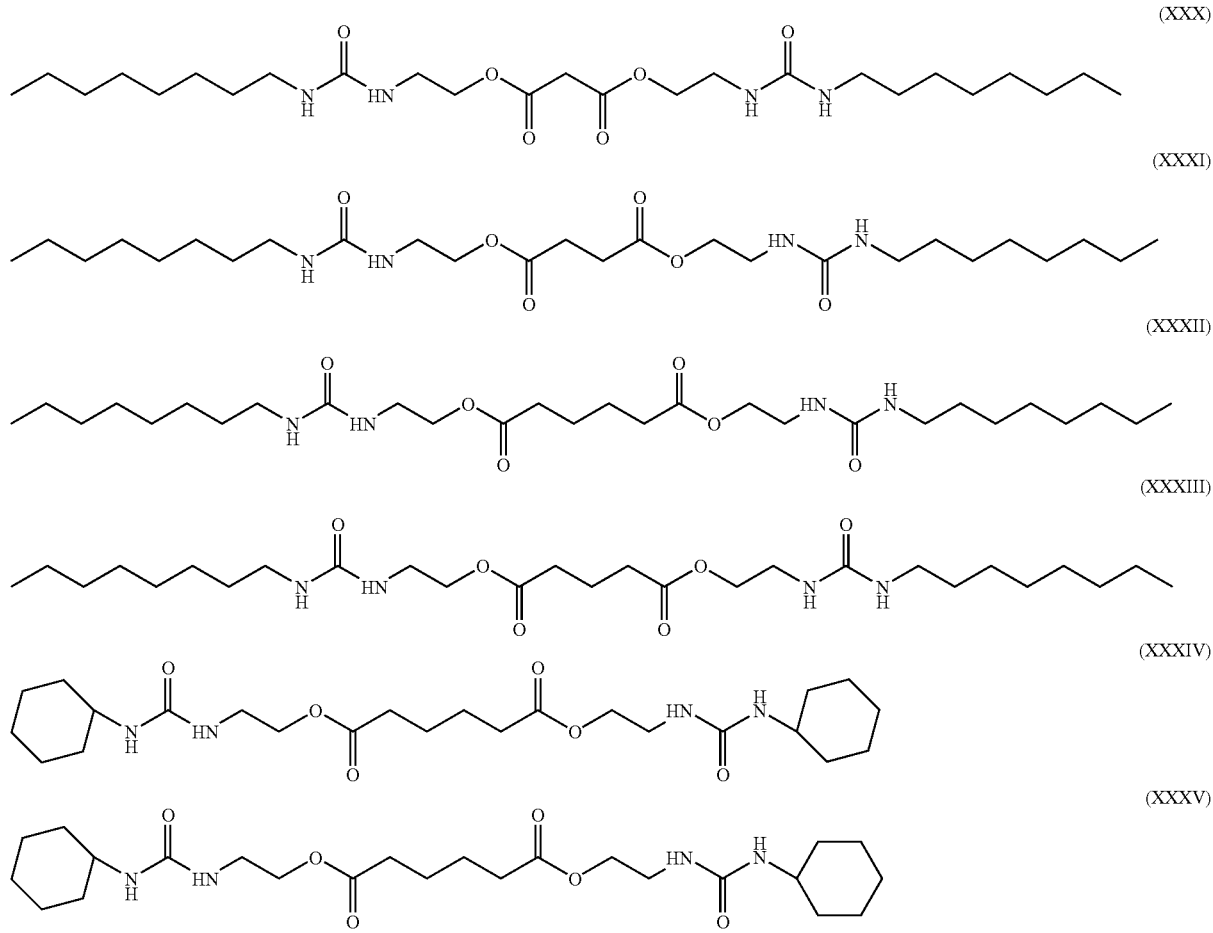

Other H-bonded organogelators useful in the invention include compounds of formulae (XXXVI) to (XLII). These structures are defined by formula (I) with p equal to 1, X equal to NH, Y equal to nothing, with Z equal to O, with $R^2$-$R^4$ as defined above. These organogelators are prepared by reacting two equivalents of an alpha-amino ester or beta-amino ester component with a diisocyanate component. Alternatively, two equivalents of a glycin-ester derived isocyanate or a longer chain ester isocyanate can be used in a reaction with a diamine to form these structures.

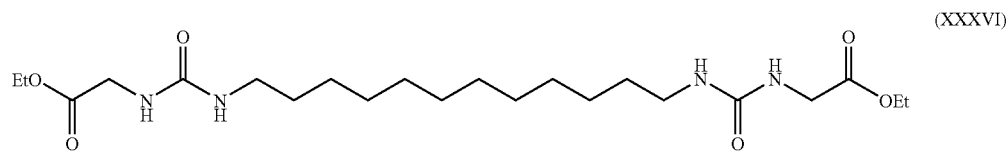

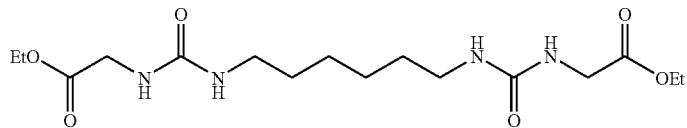

(XXXVII)

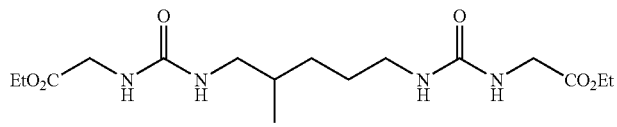

(XXXVIII)

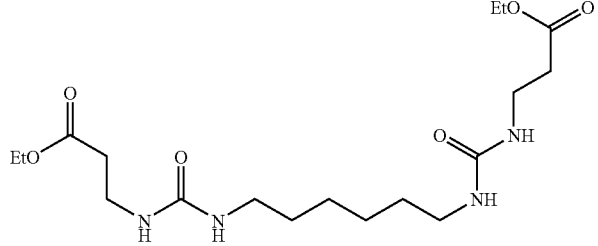

(XXXIX)

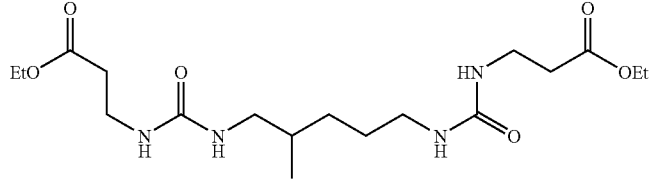

(XL)

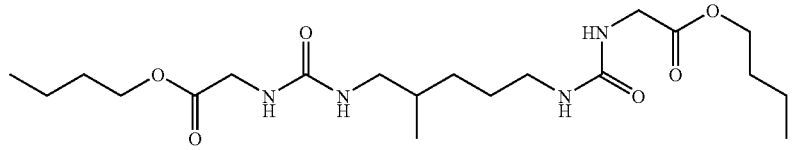

(XLI)

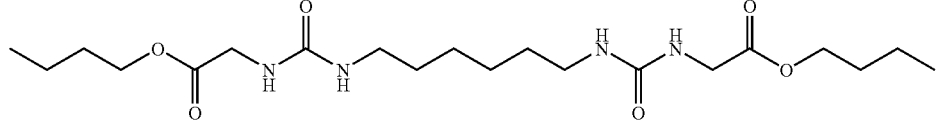

(XLII)

Other H-bonded organogelators useful in the invention include compounds of formulae (XLIII) thru (XLV). These structures are defined by formula (IIA), with $R^7$-$R^8$ as defined above. These organogelators are prepared by reacting three equivalents of amine or amino alcohol with an isocyanurate-trimer component, procedures for which are disclosed in U.S. Pat. No. 4,677,028, hereby incorporated by reference. The amino alcohols may be further esterified to provide esters.

(XLIII)

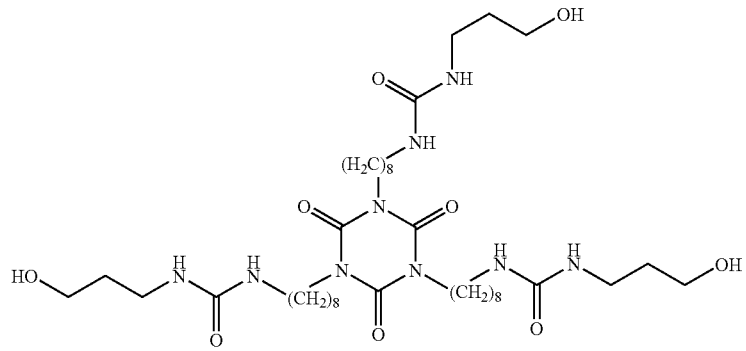

(XLIV)

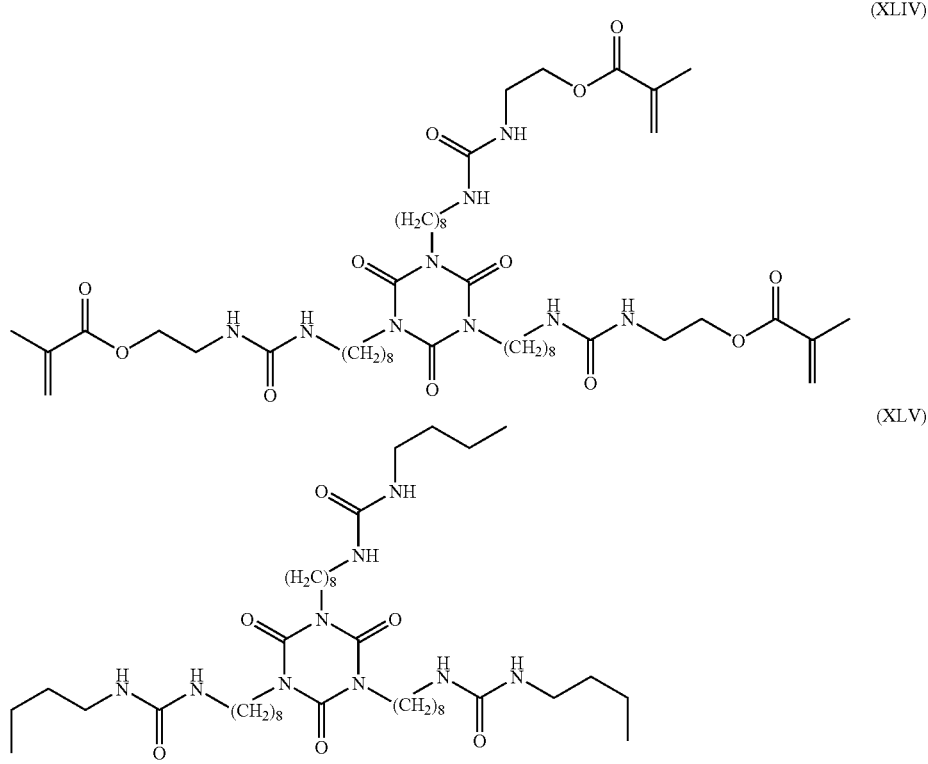

(XLV)

The isocyanurate-trimer used for the preparation of the compounds of formula (IIA) are preferably derived from an diisocyanate containing 5-14 carbon atoms, particularly from a diisocyanate containing 8-12 carbon atoms, and more preferably from hexamethylene diisocyanate. Examples of suitable diisocyanates include trimethylene diisocyanate, tetramethylene diisocyanate, hexamethylene diisocyanate, cyclohexyl-1,4-diisocyanate, dicyclohexylmethane4,4'-diisocyanate, 1,5-dimethyl-2,4-bis(isocyanatomethyl)benzene, 1,5-dimethyl-2,4-bis(ω-isocyanatoethyl)benzene, 1,3,5-trimethyl-2,4-bis(isocyanatomethyl)-benzene, 1,3,5-triethyl-2,4-bis(isocyanatomethyl)benzene, a heterocyclic diisocyanate available as Desmodur TT™ of Bayer, dicyclohexyldimethyl-methane4,4'-diisocyanate, 1,4-toluene diisocyanate, 2,6-toluene diisocyanate and diphenylmethane4,4'-diisocyanate. If desired, use may also be made of a heterocyclic trimer of 2 or 3 different diisocyanates. Optionally, use may be made of mixtures of the heterocyclic triisocyanates referred to above.

Other H-bonded organogelators useful in the invention include compounds of formulae (XLVI) thru (LI). These structures are defined by formula (IIC) and (IID), with $R^3$, $R^7$ and $R^{10}$ as defined above. These organogelators are prepared by esterifying N-butoxycarbonyl (BOC)-aspartic acid with fluoro alcohols as described in by Beckman, et al. (Science (1999) 286,1540-1543). Deprotection of the amine with trifluoroacetic acid in dichloromethane is followed by treatment with either a mono or diisocyanate to provide structures (IIC) and (IID), respectively.

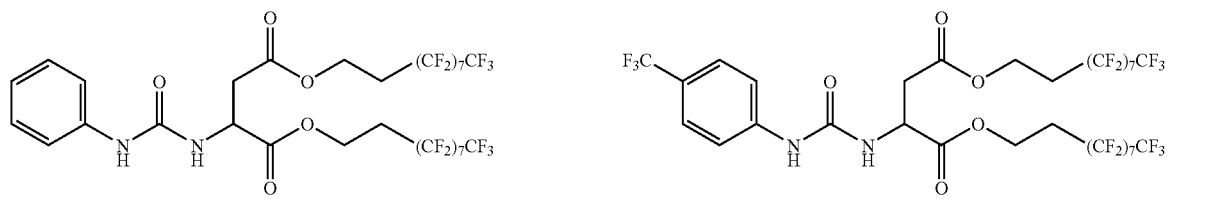

(XLVI)                                               (XLVII)

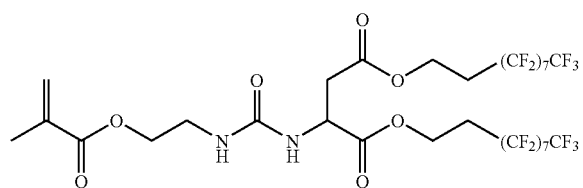

(XLVIII)

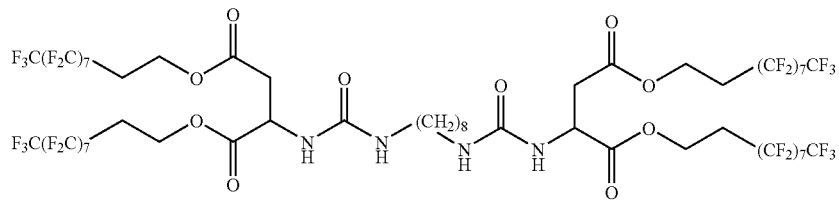
(XLIX)

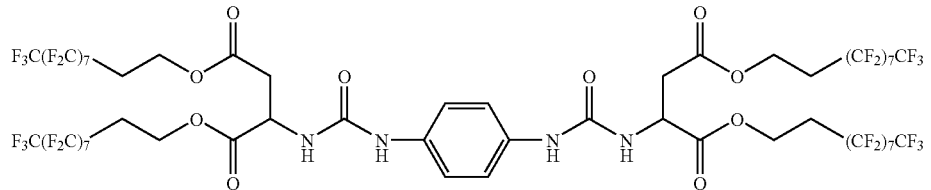
(L)

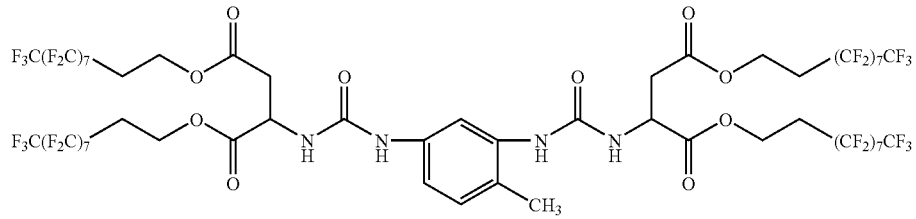
(LI)

Preferred H-bonded organogelators include compounds of formulae (V), (XXII), (XXVI), (XXIX), (XL), (XLI), (XLIII) and (XLVI). The syntheses of many of the organogelators listed above are described in U.S. provisional application No. 60/643,514, hereby incorporated by reference.

π-Stacked Organogelators

Aromatic π-stacking interactions are important assembling forces in nature (see Waters, Curr. Opinion Chem. Bio. (2002) 6, 736). Organogelators that contain π-stackable groups have been reported on several occasions, and in most cases π-stacking interactions in conjunction with hydrogen bonding, metal-metal interactions or van der Waals interactions cause organogelation. In rare instances and under special circumstances, for instance, low temperature and/or high concentration, organogelation of π-stacked systems has been observed in the absence of another interaction mode (see Ajayaghosh, J. Am. Chem. Soc. (2001) 123, 5148). Thus, π-stacked organogelators useful in the invention include those that may have other modes of interactions as well, such as H-bonding, van derWaals interactions and metal-metal interactions.

The π-stacked nanoweb gels useful in the invention include those derived from π-stacked organogelators such as anthracene-based compounds including anthracenes, anthraquinones, and phenazines, described in US 2004/0065227, Breton, et al., hereby incorporated by reference; binary anthracene-based gelators such as reported by Shinkai (Org. Biomol. Chem. (2003) 1, 2744); 2,3-bis(n-alkoxy)anthracenes such as 2,3-bis(n-decyloxy)anthracene as reported by Desvergne (Chem. Comm. (1991) 6, 416); all hereby incorporated by reference.

Other π-stacked organogelators useful in the invention include trinuclear gold-pyrazolate gelators as reported by Aida (J. Am. Chem. Soc. (2005) 127, 179); π-stacked porphyrin aggregates as reported by Shinkai (J. Am. Chem. Soc. (2005) 127, 4164); photochromic organogelators that incorporate photostimulable 2H-chromene units, as reported by Vögtle (Langmuir (2002) 18, 7096); and pyrene-derived one- and two-component organogelators as reported by Maitra (Chem. Eur. J. (2003) 9, 1922); all of which are hereby incorporated by reference.

A preferred π-stacked organogelator for the invention is compound of formula (LII) the synthesis of which is described in J. Am. Chem. Soc. (2004)136, 10232.

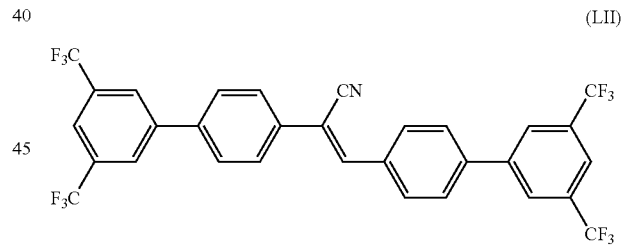
(LII)

Solvents for Organogelators

The process of the invention encompasses the use of a wide variety of organogelators. Solvents and specific conditions for forming gels of many organogelators are available in the patent and scientific literature. However, the one skilled in the art will recognize that many specific gelators may not be fully described in the available art so as to be useful in the invention without some preliminary gelling experimentation. For such cases, a methodology has been developed for matching a solvent system with specific gelators to allow efficient gel formation. In general if the gelator is too soluble, it will dissolve without forming a gel even at high concentrations. If the gelator is not soluble enough, it may or may not dissolve at high temperature, but precipitate again as the temperature is lowered. Ideally, the organogelator should dissolve in a solvent at some temperature and assemble into a network. Preferably the gelators have a solubility in a solvent system of about 0.1 to 5 wt % at a temperature/pressure above the gel point. Changing the temperature and/or pressure, adjusting the solvent composition, adjusting the pH, altering the shear-state of thixotropic systems, or a combination of parameters can be used to induce gelling.

A simple screening protocol for evaluating thermo-reversible gels allows evaluation of a specific gelator with different solvents in parallel using a reactor block. In a typical set-up, 2 wt % slurries of the organogelator in solvents of varying polarities can be prepared, for example a series may include: water, n-butanol, ethanol, chloroform, toluene, and cyclohexane. The vials are then placed in a reactor block for 1 h while stirring at a temperature close to the boiling point of the solvent to induce dissolution. In the case of some gelators, for instance, urea-based gelators, additives such as lithium salts, for instance lithium nitrate, can be added in small amounts (0.1 to about 10 wt %, based on the amount of organogelator) as described in U.S. Pat. No. 6,420,466, hereby incorporated by reference. Upon cooling, gelation may occur and is evident by formation of a translucent to opaque appearance without the formation of solid crystals, and/or a significant increase in viscosity. If gelation does not occur, one can screen different solvents or solvent mixtures as well as different additives and additive levels. If a gelator sample is soluble in a given solvent, but organogelation does not occur, then one can either raise the gelator concentration to, for instance, 3 or 5 wt % and repeat the heating cycle, or one can lower the solubility of the compound by using a solvent mixture of lower polarity.

Preferred solvents for H-bonded organogelators are those having H-bonding capability that allows disruption of inter-molecular H-bonding between solute molecules. Water, ammonia, alcohols, sulfoxides, esters, ethers, amines, amides, and lactams are useful. H-bonded organogelators often exhibit very high solubility in the lower alcohols such as methanol and ethanol. Whereas H-bonded organogelators often exhibit lesser solubility in the higher aliphatic and cyclic alcohols including propanol, butanol, hexanol, cyclohexanol, and isomers thereof, making them more desirable for use as gelating solvents. In one embodiment, preferred solvents are those that are miscible with supercritical carbon dioxide. Specific solvents that are especially useful in forming gelling mixtures include: water, the lower aliphatic and cyclic alcohols such as ethanol, isopropyl alcohol, butanol, hexanol, cyclohexanol, cylopentanol, and octanol; aliphatic and aromatic hydrocarbons such as hexane, cyclohexane, heptane, octane, toluene, xylenes, and mesitylene; amides and lactams such as N-methylpyrrolidone, pyrrolidone, caprolactam, N-methyl caprolactam, dimethyl formamide, and dimethyl acetamide; ethers such as dibutyl ether, dipropyl ether, methyl butyl ether; ether alcohols such as 2-methoxy-ethanol, 2-butoxyethanol, and others in the class of ethers known as CELLUSOLVES®; esters such as ethyl acetate, butyl acetate and the like; aliphatic and aromatic halocarbons such as dichloromethane, 1,2-dichloroethane, 1,1,1-trichloroethane and dichlorobenzene. Butanol, and especially n-butanol, is a preferred solvent for use in the process of the invention.

Supercritical fluids, those above the critical point pressures and temperatures, can act as solvents for organogelators in the formulation of gelling mixtures. A particular preferred supercritical fluid is carbon dioxide.

Gelling Mixture

The gelling mixture, as applied to the porous support, can be in the form of: a homogeneous isotropic solution; a gel that can be shear-thinned (thixotropic) to form a fluidized gel; or a gel in the form of a film, sheet, or powder that can be melted to form a fluidized gel. Formulation of a suitable gelling mixture to practice the invention depends upon the methods anticipated for applying the gelling mixture and gelling the coated support. For instance, in a preferred embodiment the gelling mixture is a gel that can be shear-thinned prior to, or during, application to form a fluidized gel. The fluidized gel can coat and/or penetrate the porous support to provide the coated support. Organogelators suitable for formation of thixotropic gels include those of formulae (I) (IIA), and (IIB), and compounds of formula (IIA) are especially suitable. A specific preferred compound for formation of thixotropic gels is (XLIII).

In another preferred embodiment the gelling mixture is a homogeneous isotropic solution that, if so desired, is heated above ambient conditions. After applying the solution to provide the coated support, the coated support can be cooled to induce gelling. Organogelators suitable for formation of homogeneous isotropic solutions include those of formulae (I) and (IIA-D) and compounds of formula (I) and (IIC) are especially suitable. Specific preferred compounds for formation of homogeneous isotropic solutions include (V), (XXII), (XXVI), (XXIX), (XL), (XLI), (XLVI), and (XLIII).

Suitable gelling mixtures for the invention preferably comprise 0.01 to 20 wt % of one or more organogelators, and preferably, 0.5 to 5 wt %, with the remainder being solvent and other processing aids, for instance lithium salts.

Applying the gelling mixture to the porous support can be done by a variety of methods including one or more of the steps of: spraying, coating, blading, casting laminating, rolling, printing, dipping, and immersing; and allowing gravity, diffusion, and/or flow through of the gelling mixture into the porous support, and, optionally, applying pressure, heat or vacuum. Spraying, coating, blading, casting, and immersing are preferred methods for applying thixotropic gels and spraying and blading are most preferred. Laminating and heating is a preferred method for applying solid gels in the form of films. Spraying, coating, blading, casting, printing, and immersing or dipping are preferred methods for applying homogeneous isotropic solutions. In some instances, it is advantageous to remove excess gelling mixture from the surface of the porous support, such as by scraping or the like. The term "coated support" includes those wherein the gelling mixture coats one or more surfaces(s) of the support, impregnates the support, or any combination thereof.

Gelling the coated support can be accomplished by a variety of methods depending upon the nature of the gelling mixture. In one preferred embodiment, wherein the gelling mixture is a thermo-reversible gel, the gelling step comprises cooling of a homogeneous solution of the gelling mixture on and/or within the coated support. The gelling mixture can be pre-heated to provide a homogeneous solution or can be cooled from ambient temperature, if so desired. Another preferred embodiment, wherein the gelling mixture is a gel applied with shearing, the gelling step can comprise abating the shearing on the coated support. This can be accomplished by allowing the coated support to sit for a period of time in the absence of shear. In another embodiment, wherein the gelling mixture is sensitive to pH, the coated support can be subjected to a change in pH. In other embodiments the solvent can be modified by addition of a non-solvent in a solvent exchange, partially removed, or a solubilizing agent, such as lithium salts can be removed, to provide a gel.

Removing the solvent from the nanoweb gel, provides the porous nanoweb coating on and/or within the treated support. Removing the solvent can be achieved through a variety of routes including freeze drying, ambient drying, oven, radiant and microwave heating, vacuum drying (with or without heat), or critical point drying (CPD). Alternatively the solvent can be exchanged with another fluid, in a fluid-fluid extraction process or a supercritical fluid extraction (SFE), which then can be removed from the gel via one of the aforementioned drying techniques, if so desired. A preferred method for removing the solvent from the nanoweb gel for generating antimicrobial surfaces comprises at least one step selected from: freeze drying, critical point drying, fluid-fluid extraction and supercritical fluid extraction. A most preferred method of drying is solvent exchange followed by critical point drying. For gels derived from organogelators that are highly fluorinated, including those of formula (IIC) and (IID), ambient drying and vacuum oven drying also are preferred methods of drying.

The drying method can have a profound effect on the resultant nanoweb coating as the various drying methods occur over different time scales, place different stresses on the nanoweb structure, and involve the crossing of different phase boundaries.

To form a nanoweb coating, the stresses of drying, particularly those due to capillary forces and solvent diffusion, must be considered. Drying with a supercritical fluid (SCF) minimizes these stresses as they exhibit a density typical of a liquid but transport properties like a gas. A preferred drying method is CPD, wherein the gel solvent is exchanged for liquid carbon dioxide, which is subsequently brought to a temperature and pressure above its critical point and then slowly vented from the composite material. Alternatively the solvent can be directly exchanged for a SCF in a SFE extraction, followed by venting of the SCF or gas from the structure. If the liquid carbon dioxide or desired SCF is not directly soluble with the solvent, then an intermediate transfer solvent, which is soluble in liquid carbon dioxide or the desired SCF, can be used. The transfer solvent is exchanged for the gelling solvent and the above procedures are subsequently used. A preferred transfer solvent for use with supercritical carbon dioxide is ethanol, but other solvents, as listed above, may be used as a transfer solvent, if so desired.

Carbon dioxide is the preferred SCF for both CPD and SFE. Other solvents useful as SCF include nitrous oxide, FREON® 13, FREON® 12, F FREON® 116, and FREON® TF. U.S. Pat. No. 4,610,863, hereby incorporated by reference, discloses a number of useful SCF's and their properties relating to CPD. Supercritical carbon dioxide shows good pressure dependent miscibility with a broad array of solvent materials and thus can be tuned for a given process.

In vacuum drying, the driving force for solvent removal from the coated support is increased such that the solvent can be removed more readily, and thus without disruption of the assembled nanoweb. Heat can be used in combination with vacuum if it does not disrupt the gelled assembly. Ambient drying is performed at atmospheric pressure and optionally with heat. In freeze-drying, the coated support is rapidly frozen (on a time scale that does not allow for rearrangement of the gel structure) and solvent is subsequently sublimed away to provide the treated support.

Figure 1B:

FIG. 1 illustrates the DB-SEM micrograph at (a) 15000× and (b) 35000× magnification showing the nanoweb coating prepared by the method of example 3 covering the surface and penetrating the interior of the porous support.

Another embodiment of the process of the invention includes the independently optional steps of: annealing the treated support; and washing the treated support with a non-solvent. Annealing may be accomplished by heating the treated support at a temperature below the nanoweb melting point. Such a process may be desirable when an improvement in the crystallinity of certain nanoweb formulations is desired.

Characterizations

The treated support provided by the process of the invention can be characterized by a pore size distribution, specific surface area determined using the BET method, and quantitative estimation of surface tension relative to that of the untreated porous support as disclosed in U.S. patent application Ser. No. 11/294,009, filed on Dec. 5, 2005. Furthermore the treated support can be characterized by a biofilm cell count that measures the ability of a treated material to resist colonization by *Escherichia coli* (*E. coli*) in a short term exposure test (6 h), relative to a control. The characterization used herein is known as a mini-shake flask test (MSFT) and is a scaled-down version of ASTM E2149-01 "Standard Test Method for Determining the Antimicrobial Activity of Immobilized Antimicrobial Agents Under Dynamic Contact Conditions", commonly referred to as the shake flask test. The MSFT is scaled down about 10 to 25 fold in the amount of liquid suspension of bacteria used, but is otherwise the same as the referenced ASTM method. Samples exposed to a suspension of *E. coli* are rinsed and then sonicated in a known volume of solvent, and the number of bacteria that colonized the sample determined. The biofilm numbers are reported herein as colony forming units per mg (cfu/mg) of sample.

As demonstrated by the data in Table 1, the cfu/mg for the treated samples according to the invention is drastically reduced over the untreated control samples. For instance, the control versus Example 1 shows greater than an 80% reduction in cfu/mg.

The treated supports provided by the process of the invention can be used as gas-solid, gas-liquid, liquid-liquid, and liquid-solid filters. The gas can be air, carbon dioxide, oxygen, nitrogen, a noble gas, or any other process gas used in industrial or commercial processes. The liquid can be an organic solvent, oil, water, an aqueous solution, or some combination thereof. The liquid can contain a biological or chemical substrate. The process of the invention can provide air, water, and solvent filters with enhanced resistance to biofouling over untreated materials. Filters can be in the form of nonwoven pleated or unpleated cartridge filters, glass or other ceramic microfiber filters.

The process of the invention may also provide barrier fabrics with resistance to biofouling, such as for protective clothing or construction wrap, in which good barrier against liquid penetration is provided while maintaining good air and moisture vapor permeability.

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

EXAMPLES 1-6

The experimental parameters and biofouling resistance of Examples 1-6 of the invention are listed in Table 1. Unless otherwise indicated, a porous supports were treated in the following manner: a 2 wt % of the indicated organogelator in n-butanol was mixed in a reaction vial to form a slurry, followed by immersing a sample (several square centimeters) of the indicated support material into the slurry, heating the immersed sample to a temperature of about 95° C., stirring for about 1 hour and cooling to form a gel. The coated support so formed was removed from the reaction vial, and where necessary, bulk excess gel was removed from the coated support with tweezers and if indicated, remaining excess gel was scraped from the support.

Drying to provide the nanoweb was conducted using one of two methods: critical point drying (CPD), or vacuum oven drying (VO).

A critical point drying apparatus (Balzers CPD 020) was used for the CPD. The instrument consisted of a chamber with a stirrer and inlet and outlet ports equipped with metering valves. The CPD chamber was filled half full with ethanol (20 mL), which was used as the transfer solvent. The sample was rinsed with the transfer solvent prior to loading it into the holder. The sample was placed in a holder consisting of a mesh basket designed for CPD made of metal or plastic and immersed into the transfer solvent in the drying chamber. The chamber was sealed and cooled to 15° C. Carbon dioxide liquid was added to the chamber through the input port to fill the chamber to volume. The mixture was stirred for about 5 min. The outlet port valve was opened to slowly drain the liquid so the chamber was about half full. This successive dilution process was repeated 5 times with carbon dioxide. After the final dilution and draining to half full, the temperature was increased to 40° C. such that the carbon dioxide reached its critical point as indicated by the pressure gauge (between 80-85 bar at 40° C.). The carbon dioxide was slowly vented from the chamber over the course of 0.25 h to ambient pressure to provide treated support. The sample was stored over desiccant (DRIERITE®, anhydrous calcium sulfate) in a sealed container.

Vacuum oven drying (VO) was conducted with a laboratory vacuum oven (VWR Scientific Products). The coated support was placed on an aluminum tray and loosely covered with another aluminum tray. The trays were transferred into the oven and the sample was dried at 30° C. overnight (about 16 h). During the first 0.5 h of drying, full vacuum was applied with a nitrogen purge resulting in a reading of 26 in Hg on the vacuum gauge. The remainder of the drying cycle was performed with full vacuum without a nitrogen purge (resulting in 29 in Hg).

EXAMPLE 7

This example illustrates the methods used to measure the ability of the treated supports to resist colonization by *Escherichia coli* in a short term exposure.

Organism, media, and culture conditions. *Escherichia coli* ATCC 25922 was obtained from the American Type Culture Collection (Manassas, Va.). Frozen permanent cultures were maintained at −70° C. using the Microbank® system (Pro-Lab Diagnostics, Richmond Hill, ON, Canada). Working stocks were prepared by removing a bead from the culture vial and rolling it on the surface of a nutrient agar plate, followed by incubating the plate overnight. An isolated colony was picked and re-streaked to a fresh nutrient agar plate to produce a working stock plate. To make overnight cultures, a single colony was picked from the working stock and inoculated into trypticase soy broth (Difco™, TSB). The working stock cultures were replaced every few weeks. Overnight cultures were grown in an incubator, with shaking, at 37° C.

Cultures were routinely grown in TSB, and on nutrient agar plates (BBL™). Resistance to colonization evaluations using the mini-shake flask test (MSFT) were done in a variation of M9 minimal salts media. This M9 media was prepared according to the directions in "Molecular Cloning—A Laboratory Manual", (Maniatis, Fritsch, & Sambrook, Cold Spring Harbor Press, 1982). A solution of $Na_2HPO_4$ (6 g/L), $KH_2PO_4$ (3 g/L), NaCl (0.5 g/L), and $NH_4Cl$ (1 g/L) was adjusted to pH 7.4 with dilute sodium hydroxide. The solution was autoclaved, cooled, and filter-sterilized (0.2 μm filter, Nalgene Nunc International, Rochester, N.Y. 14602). Solutions of 1 M $MgSO_4$ (2 ml/L), 20 wt % glucose (10 ml/L), 1 M $CaCl_2$ (0.1 ml/L) and 10 wt % yeast extract (2 ml/L, Difco™) were added and mixed to provide the M9 stock solution. Difco™ and BBL™ are trademarks of Becton Dickinson Microbiology Systems, Sparks, Md. 21152.

A Mini-shake Flask Test, a 10-25 fold scaled down version of ASTM E2149-01, "Standard Test Method for Determining the Antimicrobial Activity of Immobilized Antimicrobial Agents Under Dynamic Contact Conditions" was used to establish the biofilm cell count of controls and treated supports. A single colony of *Escherichia coli* ATCC 25922 was inoculated from a trypticase soy agar plate into TSB (15 mL) and incubated overnight at 37° C. An inoculum assay medium was prepared by diluting an aliquot of the overnight culture 1:10,000 into 10 mM sodium phosphate buffer, pH 7.4, supplemented with 5 vol % of the M9 medium described above to achieve a concentration of approximately $5 \times 10^5$ cfu/mL. The sample to be tested was placed in a well in a 12 well microtitre plate and the assay medium (2 mL) added to the same well. After covering the plate with a lid, the plate was placed into a 37° C. incubator on an orbital shaker and incubated for 6 hours. Colony-forming units/ml (cfu/ml) in the inoculum were determined at the beginning and end of each test. At 6 hours the bulk fluid was sampled for viable cfu/ml by removing 4×20 μL aliquots and adding them to 180 μL portions of TSB in the first column of a 96 well microtitre plate and then performing ten-fold serial dilutions. The plates were incubated overnight at 37° C., scored visually by observing the last well displaying visual growth, and the number of cfu/mL calculated using an Excel spreadsheet program to calculate the Most Probable Number (MPN) of viable cfu/mL in the original sample. Bacteria on the surface of the test sample were measured by rinsing the sample with a sodium phosphate buffer, placing the sample in a sodium phosphate buffer (4 mL), and cavitating the sample in a sonic bath for 5 minutes. The bulk fluid was sampled for viable cfu/ml by performing a five-fold serial dilution and using the MPN method.

Planktonic cfu/mL ranged from approximately 1 to $3'10^6$ cfu/mL, which is comparable to the inoculum cell density after 6 hours and is comparable to values generally obtained for the inoculum at T=6 hrs in this test. Bacteria counts on the surface of the test samples, as measured by the test are listed in Table 1.

TABLE 1

| Example | Support | Gelator | Drying Method | Scrape (yes/no) | Cfu/mg, (a) |
|---|---|---|---|---|---|
| Control 1 | Tyvek 22A | None | none | no | 1.12E+04 |
| 1 | Tyvek 22A | (V) | CPD | no | 2.10E+03 |
| 2 | Tyvek 22A | (V) | CPD | yes | 7.18E+02 |
| Control 2 | Supor-800 | None | none | no | 9.45E+03 |
| 3 | Supor-800 | (V) | CPD | no | 1.40E+03 |
| 4 | Supor-800 | (V) | CPD | yes | 4.36E+03 |
| 5 | Supor-800 | (XLVI) | VO | no | 3.88E+03 |
| Control 3 | Sontara 8100 | None | none | no | 4.82E+04 |
| 6 | Sontara 8100 | (V) | CPD | yes | 4.53E+03 |

(a) average of three replicates

We claim:

1. A method for providing resistance to biofouling in a porous support, comprising:
   a) providing a porous support;
   b) providing a gelling mixture comprising a solvent and one or more organogelator(s);
   c) applying the gelling mixture to the porous support to provide a coated support;
   d) gelling the coated support to form a porous nanoweb gel that contains fibrous structures that have a dimension of up to one micron; and
   e) removing the solvent(s) from the porous nanoweb gel to provide a treated support comprising a porous nanoweb coating;
   wherein the treated support is characterized by a biofilm cell count of less than 50% that of an untreated porous support control and the porous nanoweb coating comprises self assembled fibrous structures of from 10 nm to 1000 nm average fiber diameter.

2. The method of claim 1, wherein the step of gelling the coated support to form a nanoweb gel comprises one or more steps selected from: cooling, heating, abating shearing, adding a non-solvent, and removing a solubilizing agent.

3. The method of claim 1, wherein removing the solvent from the nanoweb gel comprises at least one step selected from: freeze drying, critical point drying, fluid-fluid extraction, and supercritical fluid extraction.

4. The method of claim 1, wherein removing the solvent from the nanoweb gel comprises critical point drying.

5. The method of claim 1 wherein said organogelator(s) are characterized by a molecular weight of about 200 to about 5000 g/mol.

6. The method of claim 1 wherein said organogelator(s) form a H-bonded nanoweb gel.

7. The method of claim 1, wherein said porous support is a woven fabric, a nonwoven fabric, a porous polymer film, a porous inorganic material, wood, a wood laminate, or combinations thereof.

8. The method of claim 7, wherein said porous support is a woven fabric comprising fibers of glass, polyamides, polyesters, or combinations thereof.

9. The method of claim 7, wherein said porous support is a nonwoven fabric comprising fibers of glass, paper, cellulose acetate and nitrate, polyamides, polyesters, polyolefins, or combinations thereof.

10. The method of claim 1, wherein said gelling mixture is a homogeneous isotropic solution.

11. The method of claim 1, wherein said gelling mixture is gel in the form of a film, sheet, or powder that can be melted to form a fluidized gel.

12. The method of claim 1, wherein said gelling mixture is a gel that is shear-thinned prior to or during applying to the porous support and said gelling comprises abating said shearing in the coated support.

13. The method of claim 1, wherein said d) gelling the coated support to form a nanoweb gel comprises cooling the coated support.

14. The method of claim 1 additionally comprising the independently optional steps of:
   f) annealing the treated support; and
   g) washing the treated support with a non-solvent.

15. The method of claim 1, wherein said organogelator(s) are selected from the group consisting of materials of formulae (I), (IIA), (IIB), (IIC), and (IID) including isomers or mixtures of isomers thereof:

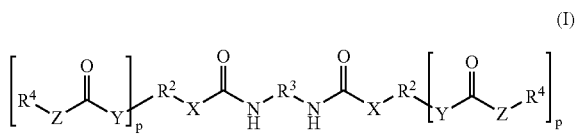

(I)

wherein
p is 0, 1, 2, or 3;
wherein
$R^3$ is a divalent C3 to C18 linear or branched alkylene group, optionally, interrupted by one or two —OC(O)— groups; C1 to C6 linear or branched alkylene group bearing a C5-C16 cycloaliphatic group; C5-C16 cycloaliphatic or alkyl substituted cycloaliphatic group; C6 to C16 aromatic or alkyl substituted aromatic group; or C1 to C6 alkyl bearing an C6 to C16 aromatic or alkyl substituted aromatic group, optionally substituted on the aromatic group with Cl, Br, I, F, $CF_3$, $CF_3O$; a —$(CH_2CH_2O)_m$—$CH_2CH_2$—group with m being 1 to 4; and
$R^4$ independently is a monovalent C2 to C16 linear or branched alkyl group; C5 to C12 cycloaliphatic group; C6 to C16 cycloaliphatic group bearing a linear or branched C1 to C8 alkyl group; C6 to C16 aromatic or alkyl substituted aromatic group; C1 to C6 alkyl bearing an C6 to C16 aromatic or alkyl substituted aromatic group; or a —$(CH_2CH_2O)_n$—$CH_3$ group with n being independently 1 to 8; all aromatic groups optionally substituted with Cl, Br, I, F, $CF_3$, $CF_3O$ and all alkyl and cycloaliphatic groups optionally substituted with one or two carbon-carbon double bonds;
wherein
if p is 0, $R^2$ is a monovalent C1 to C16 linear or branched alkyl group, a C1 to C6 linear or branched alkyl group bearing a C5-C16 cycloaliphatic group, a C5-C16 cycloaliphatic or alkyl substituted cycloaliphatic group, a C6 to C16 aromatic or alkyl substituted aromatic group, a C1 to C6 alkyl bearing an C6 to C16 aromatic or alkyl substituted aromatic group, all optionally substituted on the aromatic group with one or two Cl, Br, I, F, $CF_3$, and $CF_3O$; all alkyl and cycloaliphatic groups optionally substituted with one or two carbon-carbon double bonds; all aliphatic and cycloaliphatic groups optionally substituted with —OH, —$OR^6$, —$Si(OR^6)_3$, or —$C(O)OR^6$; wherein $R^6$ is C1 to C16 linear or branched alkyl group; or C6 to C16 aromatic group; and X is NH, O, or nothing;
wherein
if p is 1, $R^2$ is a divalent C1 to C8 linear or branched alkyl, a C1 to C6 alkyl bearing an C6 to C10 aromatic or alkyl substituted aromatic group, a —$(CH_2CH_2O)_n$—$CH_2CH_2$— group with n being 1 to 4,
wherein
if p is 2, $R^2$ is Formula (IIIa) and if p is 3, $R^2$ is Formula (IIIb)

(IIIa)

(IIIb)

wherein
q is 0 or 1; and $R^5$ is H, a C1 to C5 linear alkyl group;
wherein
if p is 1, 2, or 3, X is chosen from O or NH, Y is chosen from O, NH, or nothing, with the proviso that if X is O, Y cannot be O, and if X is NH, Y cannot be NH, Z is chosen from O, NH, or nothing; formula (IIA)

(IIA)

wherein
$R^7$ is a monovalent C1 to C16 linear or branched alkyl group; C1 to C6 linear or branched alkyl group bearing a C5-C16 cycloaliphatic group; C5-C16 cycloaliphatic or alkyl substituted cycloaliphatic group; C6 to C16 aromatic or alkyl substituted aromatic group; or C1 to C6 alkyl bearing an C6 to C16 aromatic or alkyl substituted aromatic group; optionally substituted on the aromatic group with one or two Cl, Br, I, F, $CF_3$, and $CF_3O$; all aliphatic and cycloaliphatic groups optionally substituted with one or two carbon-carbon double bonds, all aliphatic and cycloaliphatic groups optionally interrupted by one or two —OC(O)— groups, all aliphatic and cycloaliphatic groups optionally substituted with —OH, —$OR^6$, —$Si(OR^6)_3$;
wherein
$R^6$ is C1 to C16 linear or branched alkyl group; or C6 to C16 aromatic group; and
$R^8$ is a divalent C3 to C8 linear or branched alkylene group; C1 to C6 linear or branched alkylene group bearing one or two C5-C8 cycloaliphatic groups; C5-C16 cycloaliphatic or alkyl substituted cycloaliphatic group; C6 to C16 aromatic or alkyl substituted aromatic group; or C1 to C6 alkyl bearing an C6 to C16 aromatic or alkyl substituted aromatic group; formula (IIB)

(IIB)

wherein
$R^9$ is a divalent C2 to C18 linear or branched alkylene group; C1 to C6 linear or branched alkylene group bearing a C5-C16 cycloaliphatic group; C5-C16 cycloaliphatic or alkyl substituted cycloaliphatic group; or a —$(CH_2CH_2O)_m$—$CH_2CH_2$— group with m being 1 to 4, and $R^7$ is as defined above; formula (IIC)

(IIC)

wherein
$R^7$ is as defined above and $R^{10}$ is —$(CH_2)_u$—$(CF_2)_v$—$CF_3$, with u equal to 1 to 4, and v equal to 0 to 9; and formula (IID)

(IID)

wherein $R^3$ is as defined above and $R^{10}$ is as defined above.

16. The method of claim 15, wherein the organogelator(s) are selected from the group consisting of materials of formulae (IIC) and (IID) and wherein removing solvent from the nanoweb gel comprises at least one step selected from: freeze drying, ambient drying, vacuum drying, critical point drying, fluid-fluid extraction, and supercritical fluid extraction.

* * * * *